(12) United States Patent
Goel (10) Patent No.: US 7,979,779 B1
(45) Date of Patent: *Jul. 12, 2011

(54) SYSTEM AND METHOD FOR SYMMETRIC TRIPLE PARITY FOR FAILING STORAGE DEVICES

(75) Inventor: Atul Goel, Foster City, CA (US)

(73) Assignee: NetApp, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/560,075

(22) Filed: Sep. 15, 2009

Related U.S. Application Data (63) Continuation of application No. 11/648,709, filed on Dec. 29, 2006, now Pat. No. 7,613,984, which is a continuation-in-part of application No. 11/304,369, filed on Dec. 15, 2005, now Pat. No. 7,640,484, which is a continuation-in-part of application No. 10/035,607, filed on Dec. 28, 2001, now Pat. No. 6,993,701.

(51) Int. Cl.
*G11C 29/00* (2006.01)

(52) U.S. Cl. ....................................... 714/770

(58) Field of Classification Search .................. 714/770
See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A * | 5/1980 | Patel | 714/804 |
| 4,375,100 A | 2/1983 | Tsuji et al. | |
| 4,435,807 A * | 3/1984 | Scott et al. | 714/804 |
| 4,467,421 A | 8/1984 | White | |
| 4,517,663 A | 5/1985 | Imazeki et al. | |
| 4,547,882 A * | 10/1985 | Tanner | 714/755 |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |

(Continued)

FOREIGN PATENT DOCUMENTS

EP 1 324 200 A2 7/2003

(Continued)

OTHER PUBLICATIONS

Anvin, Peter H, "*The Mathematics of RAID 6*," Dec. 2004.

(Continued)

*Primary Examiner* — James C Kerveros
(74) *Attorney, Agent, or Firm* — Cesari and McKenna, LLP (57) ABSTRACT

A symmetric triple parity (TP) technique in an array comprising a number p of storage devices, such as disks, with p being a prime number is provided. The p disks are organized as one row parity disk, two symmetric parity disks and p-3 data disks. Phantom diagonal and anti-diagonal parity disks assumed to be present are further assumed to contain a predetermined value, thereby enabling parity encoding/decoding utilizing the phantom (anti-) diagonal disks. Row parity and symmetric parity values are included within the computation of the diagonal and anti-diagonal parities; accordingly, the two symmetric parity and the row parity values may be computed using the same technique as used for a triple parity erasure, i.e., in a symmetric fashion.

20 Claims, 7 Drawing Sheets

U.S. PATENT DOCUMENTS

| | | | |
|---|---|---|---|
| 4,817,035 | A | 3/1989 | Timsit |
| 4,825,403 | A | 4/1989 | Gershenson et al. |
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schilling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,271,012 | A * | 12/1993 | Blaum et al. ............ 714/6 |
| 5,274,799 | A | 12/1993 | Brant et al. |
| 5,305,326 | A | 4/1994 | Solomon et al. |
| 5,351,246 | A | 9/1994 | Blaum et al. |
| 5,375,128 | A | 12/1994 | Menon et al. |
| 5,410,667 | A | 4/1995 | Belsan et al. |
| 5,513,192 | A * | 4/1996 | Janku et al. ............ 714/804 |
| 5,537,567 | A | 7/1996 | Galbraith et al. |
| 5,579,475 | A | 11/1996 | Blaum et al. |
| 5,623,595 | A | 4/1997 | Bailey |
| 5,657,468 | A | 8/1997 | Stallmo et al. |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,092,215 | A | 7/2000 | Hodges et al. |
| 6,138,125 | A | 10/2000 | DeMoss |
| 6,138,126 | A | 10/2000 | Hitz et al. |
| 6,138,201 | A | 10/2000 | Rebalski |
| 6,158,017 | A | 12/2000 | Han et al. |
| 6,198,413 | B1 * | 3/2001 | Widmer ............ 341/59 |
| 6,223,300 | B1 | 4/2001 | Gotoh |
| 6,247,157 | B1 | 6/2001 | Edirisooriya |
| 6,289,356 | B1 | 9/2001 | Hitz et al. |
| 6,532,548 | B1 | 3/2003 | Hughes |
| 6,557,123 | B1 | 4/2003 | Wiencko et al. |
| 6,571,326 | B2 | 5/2003 | Spiegel et al. |
| 6,581,185 | B1 | 6/2003 | Hughes |
| 6,671,772 | B1 | 12/2003 | Cousins |
| 6,742,137 | B1 | 5/2004 | Frey, Jr. |
| 6,779,095 | B2 | 8/2004 | Selkirk et al. |
| 6,993,701 | B2 | 1/2006 | Corbett et al. |
| 7,073,115 | B2 | 7/2006 | English et al. |
| 7,203,892 | B2 | 4/2007 | Corbett et al. |
| 7,328,305 | B2 | 2/2008 | Kleiman et al. |
| 7,409,625 | B2 | 8/2008 | Corbett et al. |
| 2002/0083037 | A1 | 6/2002 | Lewis et al. |
| 2002/0124137 | A1 | 9/2002 | Ulrich et al. |
| 2004/0030668 | A1 | 2/2004 | Pawlowski |
| 2007/0089045 | A1 | 4/2007 | Corbett et al. |
| 2008/0016435 | A1 | 1/2008 | Goel |

FOREIGN PATENT DOCUMENTS

| | | |
|---|---|---|
| WO | WO-01/13236 A1 | 2/2001 |
| WO | WO-02/29539 A2 | 4/2002 |

OTHER PUBLICATIONS

Auspex 4Front NS2000, System Architecture, Network-Attached Storage for a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the $14^{th}$ VLDB Conference, LA, CA (1988).

Blaum, Mario, et al., *Evenodd: An Optimal Scheme for Tolerating Double Disk Failures in RAID Architectures*, Computer Architectures News, Association for Computing Machinery, New York, US, vol. 22, No. XP000450355, Apr. 1, 1994.

Blaum, Mario, et al., *Evenodd: An Efficient Scheme for Tolerating Double Disk Failures in RAID Architectures*, IEEE Transactions on Computers, vol. 44, No. 2, Feb. 1995, pp. 192-202.

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, *Maximizing Performance in a Striped Disk Array*, Proc. 1990 ACM SIGARCH 17th Intern. Symp. on Comp. Arch., Seattle, WA, May 1990, pp. 322-331.

Chen, Peter M., et al., *RAID: High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., *A Comparison of High-Availability Media Recovery techniques*, in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988.).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Kent, Jack et al., *Optimizing Shadow Recovery Algorithms*, IEEE Transactions on Software Engineering, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Lee, Edward K., et al., *The Performance of Parity Placements in Disk Arrays*, IEEE Transactions on Computers, vol. 42 No. 6, Jun. 1993, 14 pages.

Li, Don, et al., *Authors' Reply*, IEEE Transactions on Communications, 46:575, May 1998.

*Limited Distributed DASD Checksum, A RADI Hybrid*, IBW Technical Disclosure Bulletin, IBM Corp. New York, US vol. 35. No. 4A, XP000314813, Sep. 1, 1992.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Menon, Jai, et al., *Methods for Improved Update Performance of Disk Arrays*, IBM Almaden Research Center, IEEE, Jan. 1992, 10 pages.

Menon, Jai, et al., *Floating Parity and Data Disk Arrays*, Journal of Parallel and Distributed Computing, Boston: Academic Press. Inc., vol. 17 No. 1 and 2, Jan./Feb. 1993, 13 pages.

Microsoft Computer Dictionary, 5$^{th}$ Edition, 2002, p. 211.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-42. IEEE, 1989.

Park, Arvin, et al., *Providing Fault Tolerance in Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPON, San Francisco, IEEE Computer Society Press, Feb. 27-Mar. 3, 1989, pp. 112-117.

Storagesuite, *Performance Without Compromise: The Virtual Storage Architecture*, catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Scheuermann, Peter, et al., *Data Partitioning and Load Balancing in Parallel Disk Systems*, The VLDB Journal, vol. 7, Springer-Verlag, Copyright Feb. 1998, 19 pages.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stanek, William R., *Microsoft Windows 2000 Server: Administering Volume Sets and RAID Arrays*, Jan. 10, 2006, (http://www.microsoft.com/technet/prodtechnol/windows2000serv/maintain/operate/11w2kada.mspx), (Printed 1999).

Stodolsky, Daniel, et al., *Parity Logging Overcoming the Small Write Problem in Redundant Disk Array*, School of Computer Science and Department of Electrical and Computer Engineering, Carnegie Mellon University, IEEE, May 1993, 12 pages.

Stonebraker, Michael, et al., *The Design of XPRS*, Proceedings of the 14$^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

Tweten, David, *Hiding Mass Storage Under UNIX: NASA's MSS-H Architecture*, IEEE Symposium on Mass Storage, pp. 140-145, May 1990.

Weikum, Gerhard, et al., *Dynamic File Allocation in Disk Arrays*, ETH Zurich, Department of Computer Science Information Systems—Databases, ACM SIGMOD Record, vol. 20, Issue 2, Jun. 1991, 10 pages.

Wilkes, John, et al., *The HP AutoRAID hierarchical storage system*, ACM Transactions on Computer Systems, Feb. 1996, vol. 14, pp. 108-36.

Huang, Cheng "Efficient and Effective Schemes for Streaming Media Delivery," Washington University: Server Institute of Technology, Department of Computer Science, Aug. 2005, p. 1-104.

PCT Notification of Transmittal of the International Search Report and the Written Opinion of the International Searching Authority, or the Declaration, International Application No. PCT/US2006/047647, International Filing Date: Dec. 14, 2006: Date of Mailing: Mar. 3, 2009, 15 pages.

Chin-Shing Tau et al. "Efficient Parity Placement Schemes for Tolerating Triple Disk Failures in RAID Architectures" Proc. 17$^{th}$ Int Conf on Advanced Information Networking and Applications. Mar. 27, 2003; 6 pages.

Mario Blaum "A Family of MDS Array Codes with Minimal Number of Encoding Operations" Information Theory, 2006 IEEE International Symposium on, IEEE, PI; Jul. 1, 2006, pp. 2784-2788.

\* cited by examiner

SYSTEM AND METHOD FOR SYMMETRIC TRIPLE PARITY FOR FAILING STORAGE DEVICES

CROSS-REFERENCE TO RELATED APPLICATIONS

The present application is a continuation of U.S. patent application Ser. No. 11/648,709, which was filed on Dec. 29, 2006, now U.S. Pat. No. 7,613,984, by Atul Goel entitled SYSTEM AND METHOD FOR SYMMETRIC TRIPLE PARITY FOR FAILING STORAGE DEVICES, which is a continuation in part of U.S. patent application Ser. No. 11/304,369, filed on Dec. 15, 2005, now U.S. Pat. No. 7,640,484, entitled TRIPLE PARITY TECHNIQUE FOR ENABLING EFFICIENT RECOVERY FROM TRIPLE FAILURES IN A STORAGE ARRAY, which is a continuation in part of U.S. patent application Ser. No. 10/035,607, filed on Dec. 28, 2001, now U.S. Pat. No. 6,993,701, issued Jan. 31, 2006, entitled ROW-DIAGONAL PARITY TECHNIQUE FOR ENABLING EFFICIENT RECOVERY FROM DOUBLE FAILURES IN A STORAGE ARRAY, all applications are hereby incorporated by reference.

FIELD OF THE INVENTION

The present invention relates to arrays of storage systems and, more specifically, to a technique for symmetric parity computation and reconstruction to tolerate up to three failing storage devices of a storage array.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is possible that the storage system remains "online" and continues to serve requests (from clients or users) to access (i.e., read and/or write) data. If the storage system is busy serving requests, the elapsed time is for reconstruction increases. The reconstruction process time also increases as the size and number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Another failure mode of disks is media read errors, wherein a single block or sector of a disk cannot be read. The unreadable data can be reconstructed if parity is maintained in the storage array. However, if one disk has already failed, then a media read error on another disk in the array will result in lost data. This is a second form of double failure. It can easily be shown that the minimum amount of redundant information required to correct a double failure is two units. Therefore, the minimum number of parity disks that can be added to the data disks is two. This is true whether the parity is distributed across the disks or concentrated on the two additional disks.

A known double failure correcting parity scheme is an EVENODD XOR-based technique that allows a serial reconstruction of lost (failed) disks. The EVENODD technique is disclosed in an article of IEEE Transactions on Computers, Vol. 44, No. 2, titled *EVENODD: An Efficient Scheme for Tolerating Double Disk Failures in RAID Architectures*, by Blaum et al, February 1995. A variant of EVENODD is disclosed in U.S. Pat. No. 5,579,475, titled METHOD AND MEANS FOR ENCODING AND REBUILDING THE DATA CONTENTS OF UP TO TWO UNAVAILABLE DASDS IN A DASD ARRAY USING SIMPLE NON-RECURSIVE DIAGONAL AND ROW PARITY, by Blaum, et al., issued on Nov. 26, 1996. The above-mentioned article and patent are hereby incorporated by reference as though fully set forth herein.

In certain storage environments, it is common to utilize a significant number of lower quality disk drives, such as, e.g., in near line storage systems for use as short term storage before data is backed up to tape or other long-term archival systems. However, as the number of disks in an array increases, the probability that multiple failures will occur also increases. The probability is exacerbated by a lower mean time to failure (MTTF) of less expensive storage devices. Thus, it is possible to have storage systems is experiencing triple failures, that is, the concurrent failures of three devices in the storage array. Furthermore, numerous storage protocols, such as Serial Attached SCSI (SAS), Fibre Channel (FC), etc., have resulted in increasingly complex architectures for disk shelves which have resulted in a concomitant increase in the number of failures experienced by the disk shelves, thereby resulting in loss of access to each disk connected to a failed disk shelf.

One technique for correcting triple failures is an extension of the EVENODD technique termed the STAR technique, which is described in *Efficient and Effective Schemes for Streaming Media Delivery*, by Cheng Wang, dated August 2005, the contents of which is hereby incorporated by reference.

A noted disadvantage of such EVENODD and/or STAR techniques is that they utilize asymmetric parity algorithms that require different computational steps when encoding and/or decoding parity. Furthermore, asymmetric algorithms imply that each disk is not treated identically. As a result, configuration management tasks must know and identify whether a disk is of a particular type, e.g., whether a disk is a parity disk and/or a data disk. For example, a reconstruction technique may involve a plurality of differing algorithms depending on the number of failed data and/or parity disks as well as the type of failed parity disks, e.g., row parity, diagonal parity, etc. The asymmetric nature of these algorithms imposes additional computational complexity when implementing parity-based systems. This additional complexity may be especially noticeable when utilizing embedded systems to implement parity-based computations.

A further noted disadvantage of asymmetric parity algorithms is that utilization of floating parity, i.e., parity stored on any of the storage devices within a parity group instead of on one or more dedicated parity storage devices, is not feasible when utilizing asymmetric parity algorithms. This is because floating parity relies on a scheme where some blocks on the newly added disk(s) are re-assigned as parity, converting their old locations within the parity set to data. However, because of the special properties of some of the parity disks, e.g., diagonal/anti-diagonal, asymmetric algorithms cannot move/relocate parity blocks on these disks to newly added disks.

SUMMARY OF THE INVENTION

The present invention comprises a symmetric triple parity (TP) technique that utilizes an algorithm for parity computation is identical to that used for triple reconstruction. The TP technique is preferably used in an array comprising a number p of storage devices, such as disks, with p being a prime number. The disks are divided into blocks and the blocks are organized into stripes. The blocks of rows selected to form a stripe are typically contiguous on each disk, although this is not a requirement of the invention. Illustratively, the p disks are organized as three symmetric parity disks and p-3 data disks. Furthermore, in the illustrative embodiment, phantom diagonal and anti-diagonal parity disks are assumed to be present in the array. Moreover, the contents of the phantom diagonal and/or anti-diagonal parity disk are assumed to be a predetermined value, for example, zero, thereby enabling parity encoding/decoding utilizing the phantom (anti-) diagonal disks. By assuming that the phantom (anti-)diagonal disks contain a predetermined value, missing values may be computed among the data, symmetric parity and/or row parity disks in accordance with a symmetric algorithm.

The technique further assumes that the phantom diagonal parity disk stores parity information computed along diagonal parity sets ("diagonals") of the array. The blocks in a stripe are organized into p diagonals, each of which contains p-1 blocks from the data, symmetric parity and row parity disks, and all but one of which stores its parity in a block on the diagonal parity disk. Similarly, the technique assumes that the phantom anti-diagonal parity disk stores parity information computed along anti-diagonal parity sets ("anti-diagonals") of the array. Notably, the anti-diagonals have a slope that is orthogonal to the diagonals.

In the event of a triple failure, the symmetric TP technique is invoked by computing a total of p 4-tuple sums along an intermediate (i.e., middle) disk of the failed disks via generation of a number of crosses. The 4-tuple sums are thereafter reduced to a total of p-1 pairwise sums on the middle disk. The reduced pairwise sums form a solvable system of linear equations. Illustratively, the data on the middle disk is first recovered by solving the system of equations. Once a first block on the middle disk has been resolved, is its solution may be substituted into other equations until all blocks on the middle disk have been recovered. Once the middle disk has been recovered, the system performs a row-diagonal parity technique to recover the remaining two disks. In the case of an initial write operation, encoding of the initial parity information on the three parity disks utilizes the same algorithm as recovering three failed disks.

In accordance with the illustrative embodiment, the three parity values are included within the computation of the phantom diagonal and phantom anti-diagonal parities. The three parity values may be computed using the same technique as used for a triple parity erasure. During an initial write operation, a TP computation algorithm of the technique utilizes the "a priori" knowledge that the (anti-) diagonal parity values are set to a predetermined value, so that when the p-3 data blocks are written, the values of the three parity disks may be computed using TP reconstruction algorithm, thereby generating appropriate parity values to store on the parity disks. In the event of a failure of up to three disks of the array, data is reconstructed using the same algorithm as utilized for initial parity computation, i.e., in a symmetric fashion.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

A. Storage System Environment

Figure 1:
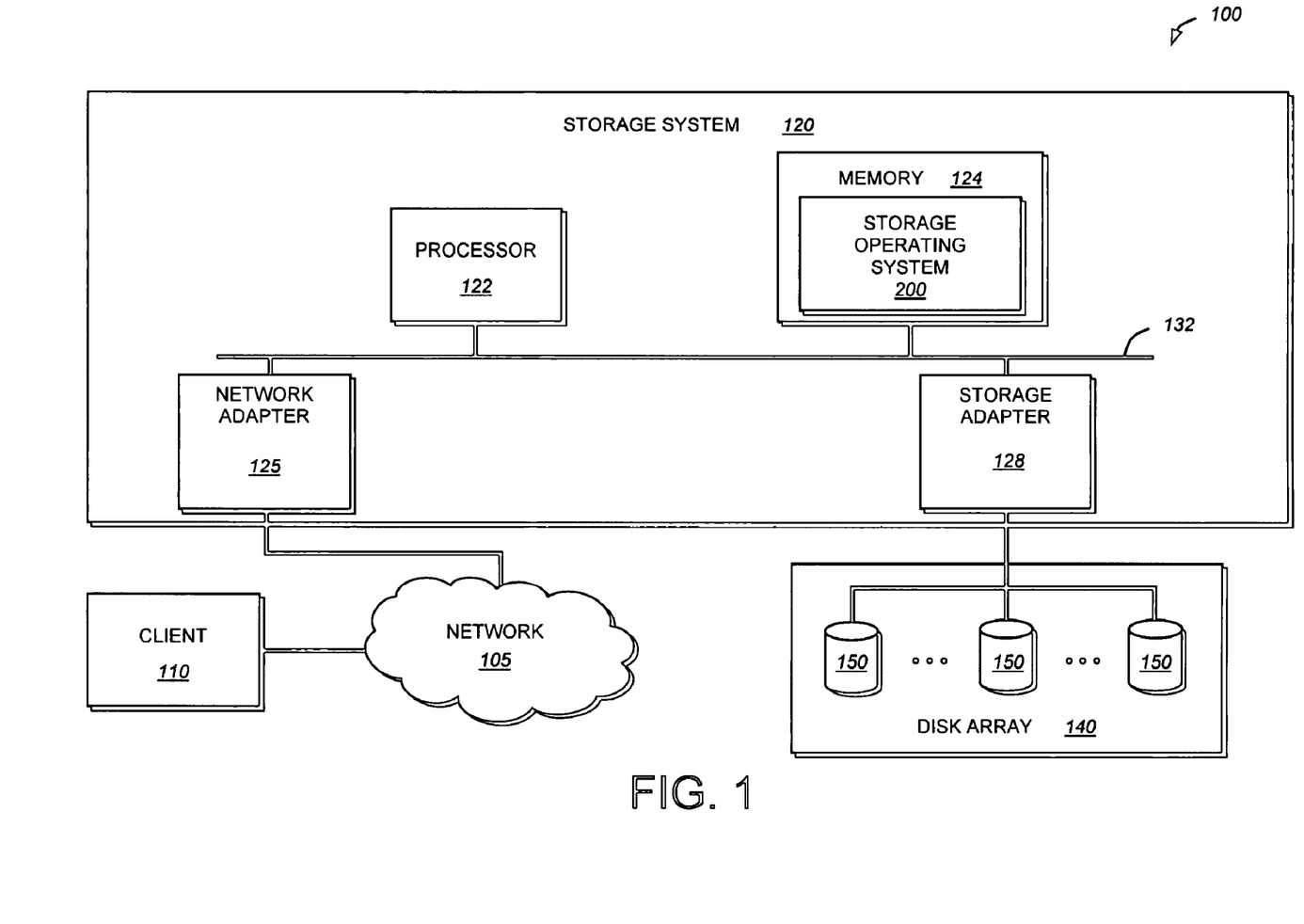
FIG. 1 is a schematic block diagram of a storage system environment including a storage system in accordance with an embodiment of the present invention.

FIG. 1 is a schematic block diagram of an environment 100 including a storage system 120 that may be advantageously used with the present invention. The inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 120 comprises a processor 122, a memory 124, a network adapter 125 and a storage adapter 128 interconnected by a system bus 132. The memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program is instructions pertaining to the inventive technique described herein.

The network adapter 125 comprises a plurality of ports adapted to couple the storage system 120 to one or more clients 110 over point-to-point links, wide area networks, virtual private networks implemented over a public network (Internet) or a shared local area network (hereinafter "network 105"). The network adapter 125 thus may comprise the mechanical, electrical and signaling circuitry needed to connect the storage system to the network 105, such as a computer network. Illustratively, the network 105 may be embodied as an Ethernet network or a Fibre Channel (FC) network. Each client 110 may communicate with the storage system 120 over network 105 by exchanging discrete frames or packets of data according to pre-defined protocols, such as TCP/IP.

The storage adapter 128 cooperates with the storage operating system 200 executing on the system 120 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 150, such as HDD and/or DASD, of array 140. The storage adapter includes input/output (I/O) interface circuitry that couples to the disks over an I/O interconnect arrangement, such as a conventional high-performance, FC serial link topology.

Storage of information on array 140 is preferably implemented as one or more storage "volumes" that comprise a cluster of physical storage disks 150, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

The present invention comprises a symmetric "triple" parity (TP) technique that provides triple failure parity correcting recovery using row parity, symmetric parity and diagonal and anti-diagonal parity in a disk array. The inventive technique is preferably implemented by a disk storage layer (shown at 240 of FIG. 2) of the storage operating system 200 to provide a method and system for constructing parity in stripes across multiple storage devices, such as disks, in a storage system. The data on the data disks is stored "in the clear", meaning it is not further encoded for storage. The contents of the array can be reconstructed entirely, without loss of data, after any one, two or three concurrent disk failures.

Broadly stated, the invention comprises p storage devices where p is a prime number. The storage devices are divided into blocks, where the blocks are the same size. The blocks are then organized into stripes that contain a same number of blocks in each device, wherein each stripe contains p-1 rows of blocks. That is, each stripe, one block is selected from each of all but one of the devices that are not the phantom diagonal or phantom anti-diagonal parity device in that stripe, with the further restriction that no two of the selected blocks belong to the same row. This is called a diagonal parity set or "diagonal". A diagonal may be formed, for example, by numbering the data, and parity devices from 0 to p-1, numbering the rows from 0 to p-2, and then assigning the block at device i, row j to diagonal (i+j) mod(p). The formation of diagonals continues (e.g., wraps around within the group of p-1 rows) until all blocks that are not on the phantom diagonal and anti-diagonal parity devices in the stripe are assigned to diagonals, with the further restriction that no two diagonals exclude all blocks from the same device. There are p diagonals. A similar technique is utilized to assign parity and blocks to anti-diagonal parity sets or "anti-diagonals." The formation of anti-diagonals continues (e.g., wraps around within a group of p-1 rows) until all blocks that are not on the phantom anti-diagonal parity and diagonal devices in the stripe are assigned to anti-diagonals, with the further restriction that no two anti-diagonals excludes all blocks from the same device. An anti-diagonal may be formed, for example, by numbering the data, and parity devices from 0 to p-1, numbering the rows from 0 to p-2, and then assigning the block at is device i, row j to diagonal (p-1-i+j) mod(p).

By assuming that the phantom (anti-)diagonal parity disks have a zero (or other predetermined) value, a triple parity recovery technique can be made symmetric to enable the same procedure to be performed for both encoding and decoding.

Parity is generally calculated as an exclusive-OR (XOR) of data blocks to form a parity block. The XOR operation is generally performed over the same 1-bit field in each input block to produce a single corresponding bit of output. As noted, the XOR operation is equivalent to two's complement addition or subtraction of two 1-bit fields. Redundant parity information may also be computed as the sum of same-sized multi-bit fields (e.g., 8, 16, 32, 64, 128 bits) in all the inputs. For example, the equivalent of parity may be computed by adding data using two's complement addition on 32-bit fields to produce each 32 bits of redundant information. This is only the case assuming non-reliance on the fact that an XOR operation directed to the same input twice into a block produces the original content of the block, as the XOR of a block with itself produces zero.

It will be apparent to those skilled in the art that a block (for purposes of parity computation) may or may not correspond to a file block, a database block, a disk sector or any other conveniently sized unit. There is no requirement that the block size used for parity computation have any relation to any other block sizes used in the system. However, it is expected that one or more integer number of parity blocks will fit into a unit defined to be one or more integer number of disk sectors. In many cases, some number of blocks will correspond to file system or database blocks, and will typically be of size 4 k (4096) bytes or some higher power of two bytes (e.g., 8 k, 16 k, 32 k, 64 k, 128 k, 256 k).

The illustrative system described herein preferably performs full stripe write operations. In particular, individual file blocks that are typically 4 k or 8 k bytes may be divided into smaller blocks used only for parity computation, so that full stripes of, e.g., 4 k byte sized blocks can be written to the disks of the array. When full stripes are written to disk, all parity computations may be performed in memory before the results are written to disk, thus reducing the burden of computing and updating parity on disk.

B. Storage Operating System

To facilitate access to the disks, the storage operating system 200 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named virtual disks (vdisks) on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
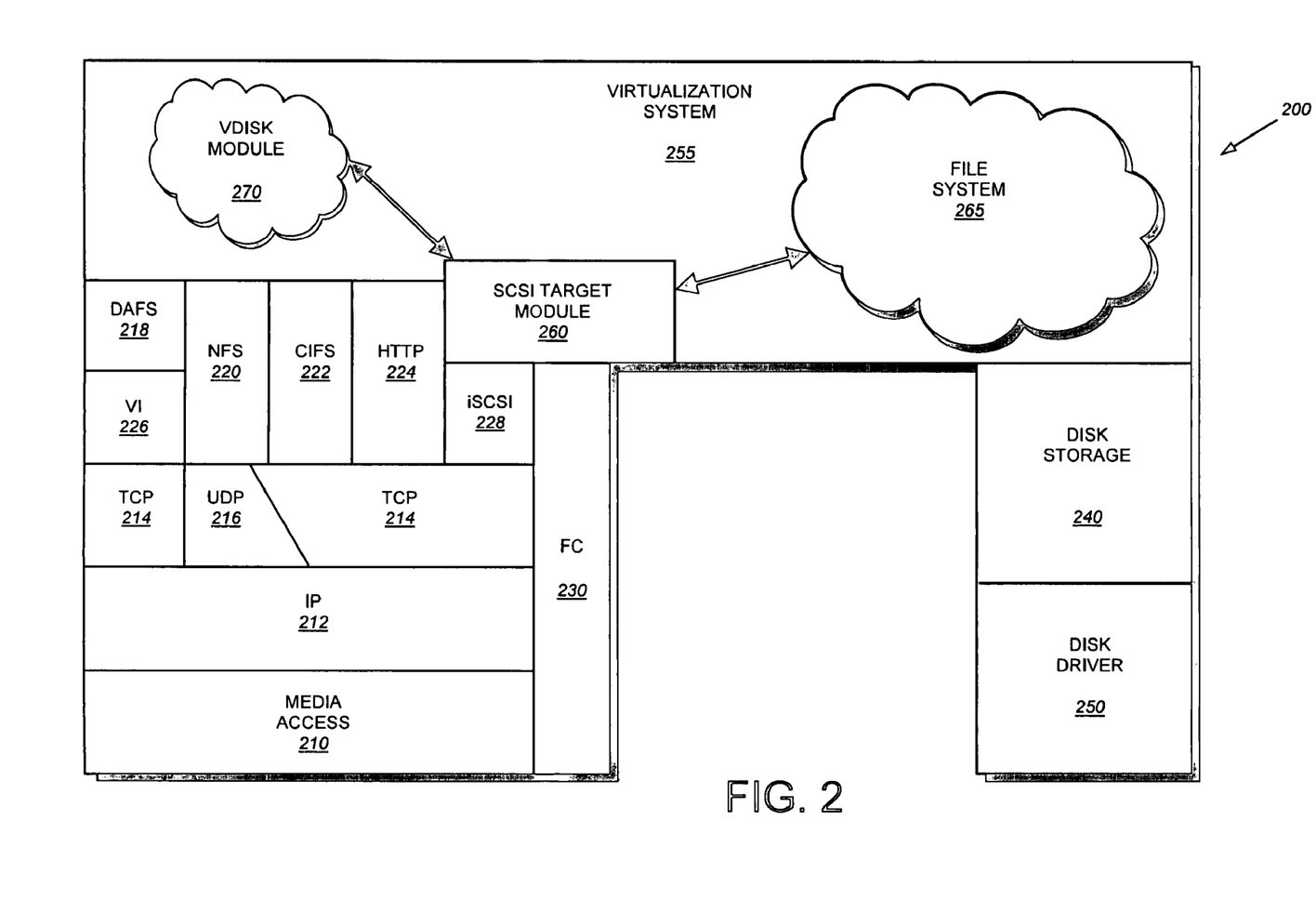
FIG. 2 is a schematic block diagram of an exemplary storage operating system for use on the storage system of FIG. 1 in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the Network File System (NFS) protocol 220, the Common Internet File System (CIFS) protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the storage system. In addition, is the storage operating system includes a disk storage layer 240, such as a RAID system, that implements a disk storage protocol, such as a RAID protocol, and a disk driver layer 250 that implements a disk access protocol such as, e.g., a SCSI protocol.

In the illustrative embodiment of the present invention, the disk storage layer (e.g., RAID system 240) implements the novel symmetric TP technique. Illustratively, during write operations, the RAID system 240 encodes data according to an encoding technique described below and, in response to the detection of one or more failures of storage devices, executes a novel TP reconstruction algorithm of the technique, also described further below. It should be noted that in alternate embodiments, the novel symmetric TP technique may be implemented by modules of the storage operating system other than the RAID system 240. As such, the description of the RAID system 240 implementing the novel symmetric TP technique should be taken as exemplary only.

Bridging the disk software layers with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the multi-protocol storage system 120. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 230, 228 and the file system 265 to thereby provide a translation layer of the virtualization system 255 between the SAN block (lun) space and the file system space, where luns are is represented as vdisks. By "disposing" SAN virtualization over the file system 265, the multi-protocol storage system reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using modes to describe the files. The WAFL file system uses files to store metadata describing the layout of its file system; these metadata files include, among others, an mode file. A file handle, i.e., an identifier that includes an mode number, is used to retrieve an mode from disk. A description of the structure of the file system, including on-disk modes and the mode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

Operationally, a request from the client 110 is forwarded as a packet over the computer network 105 and onto the storage system 120 where it is received at the network adapter 125. A network driver processes the packet and, if appropriate, passes it on to a network protocol and file access layer for additional processing prior to forwarding to the write-anywhere file system 265. Here, the file system generates operations to load (retrieve) the requested data from disk 150 if it is not resident "in-core," i.e., in the memory 124. If the information is not in the memory, the file system 265 indexes into the mode file using the mode number to access an appropriate entry and retrieve a logical volume block number (vbn). The file system then passes a message structure including is the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 150 and loads the requested data block(s) in memory for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapter 125, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the Data ONTAP software is an example of such a storage operating system implemented as a microkernel and including a file system layer to implement file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or is storage system) or general-purpose computer, including a standalone computer or portion thereof, embodied as or including a storage system 120. An example of a storage system that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, by Brian Pawlowski, et al., filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Array Configuration

The present invention comprises a symmetric triple parity (TP) technique that reduces the overhead of computing parity for a storage array adapted to enable efficient recovery from the concurrent failure of up to three storage devices in the array. The TP technique is preferably used in an array comprising a number p of storage devices, such as disks, with p being a prime number. The disks are divided into blocks and the blocks are organized into stripes. The blocks of rows selected to form a stripe are typically contiguous on each disk, although this is not a requirement of the invention. Illustratively, the p disks are organized as three parity disks and p-3 data disks. Furthermore, in the illustrative embodiment, phantom diagonal and anti-diagonal parity disks are assumed to be present in the array. Moreover, the contents of the phantom diagonal and/or anti-diagonal parity disk are assumed to be a predetermined value, for example, zero, thereby enabling parity encoding/decoding utilizing the phantom (anti-) diagonal disks. By assuming that the phantom (anti-)diagonal disks contain a predetermined value, missing values may be computed among the data, and symmetric parity disks in accordance with a symmetric algorithm.

The technique further assumes that the phantom diagonal parity disk stores parity is information computed along diagonal parity sets ("diagonals") of the array. The blocks in a stripe are organized into p diagonals, each of which contains p-1 blocks from the data and symmetric parity disks, and all but one of which stores its parity in a block on the diagonal parity disk. Similarly, the technique assumes that the anti-diagonal parity disk stores parity information computed along anti-diagonal parity sets ("anti-diagonals") of the array. Notably, the anti-diagonals have a slope that is orthogonal to the diagonals.

In the event of a triple failure, the symmetric TP technique is invoked by computing a total of p 4-tuple sums along an intermediate (i.e., middle) disk of the failed disks via generation of a number of crosses. The 4-tuple sums are thereafter reduced to a total of p-1 pairwise sums on the middle disk. The reduced pairwise sums form a solvable system of linear equations. Illustratively, the data on the middle disk is first recovered by solving the system of equations. Once a first block on the middle disk has been resolved, its solution may be substituted into other equations until all blocks on the middle disk have been recovered. Once the middle disk has been recovered, the system performs a row-diagonal parity technique to recover the remaining two disks. In the case of an initial write operation, encoding of the initial parity information the three parity disks utilizes the same algorithm as recovering three failed disks.

In accordance with the illustrative embodiment, row parity and symmetric parity values are included within the computation of the diagonal and anti-diagonal parities. The three symmetric parity values may be computed using the same technique as used for a triple parity erasure. During an initial write operation, a TP computation algorithm of the technique utilizes the "a priori" knowledge that the (anti-) diagonal parity values are set to a predetermined value, so that when the p-3 data blocks are written, the values of the three symmetric parity disks may be computed using TP reconstruction algorithm, thereby generating appropriate parity values to store on the symmetric parity disks. In the event of a failure of up to three disks of the array, data is reconstructed using the same algorithm as utilized for initial parity computation, i.e., in a symmetric fashion.

Figure 3:
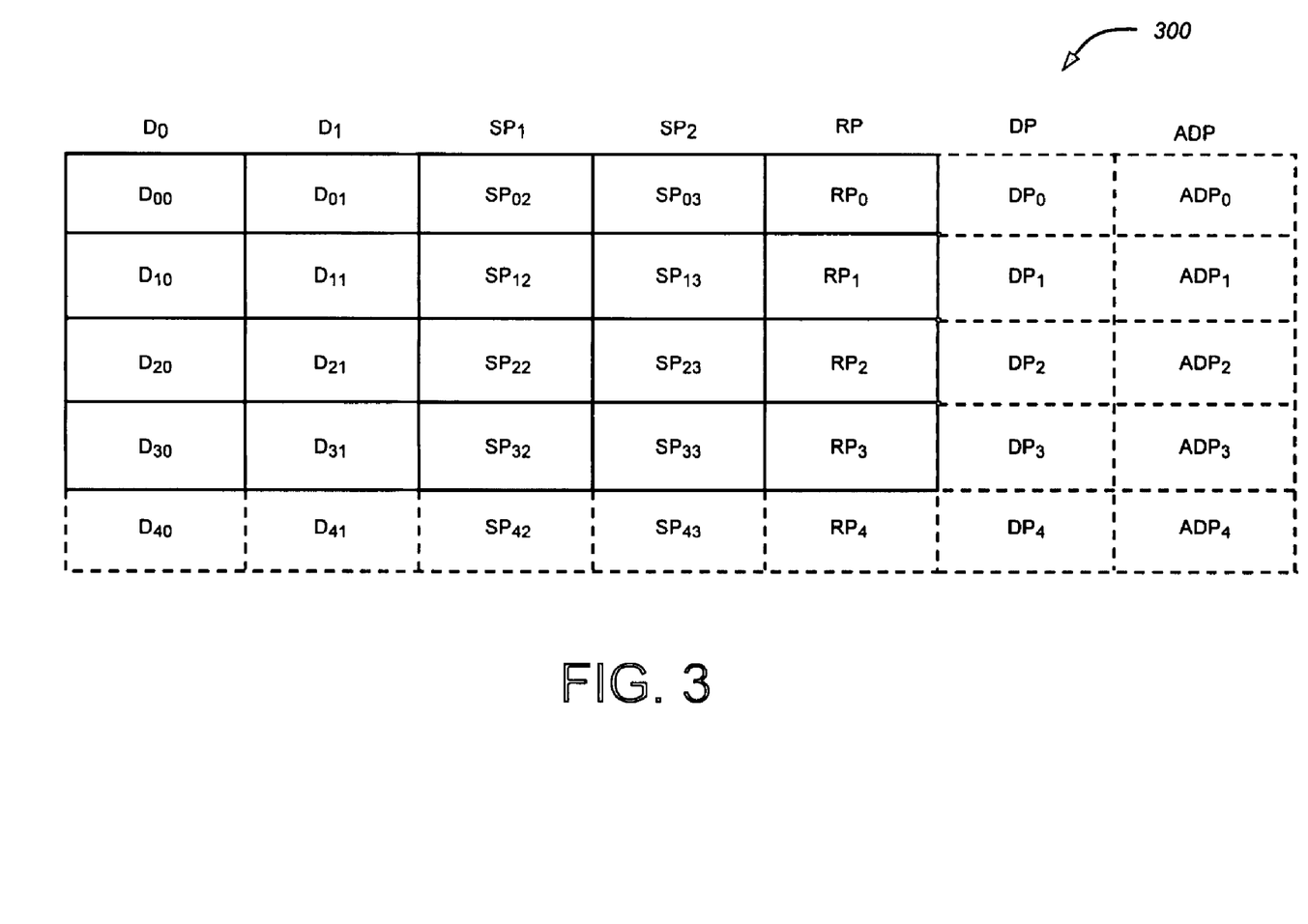
FIG. 3 is a schematic block diagram of a disk array showing disk identifiers in accordance with an embodiment of the present invention.

FIG. 3 is a block diagram of a disk array 300 organized in accordance with the novel symmetric TP technique of the present invention. Assume p equals the number of is disks in the array, where p=5. It should be noted that p=5 is used for exemplary purposes only and that any prime number may be utilized. As such, it should be noted that the principles of the present invention apply to any p. The first p-3 disks (D0-1) hold data, while disk p (RP) holds row parity, and disks SP1-2 hold symmetric parity information to enable symmetric encoding and recovery of the array. It should be noted that these three disks, i.e., disk RP and disk SP1 and SP2, may be used interchangeably. As such, the three disks may be referred to generally as symmetric parity disks. Furthermore, it should be noted that the final row of the array is a phantom row and is shown only for descriptive purposes, phantom disk DP holds diagonal parity and phantom disk ADP holds anti-diagonal parity. Disks DP and ADP are assumed to store zero values in accordance with an illustrative embodiment of the invention. However, it should be noted that in alternate embodiments phantom disks ADP/DP may be assumed to store other predetermined values. As such, the description of disks ADP/DP storing zero values should be taken as exemplary only.

Figure 4:
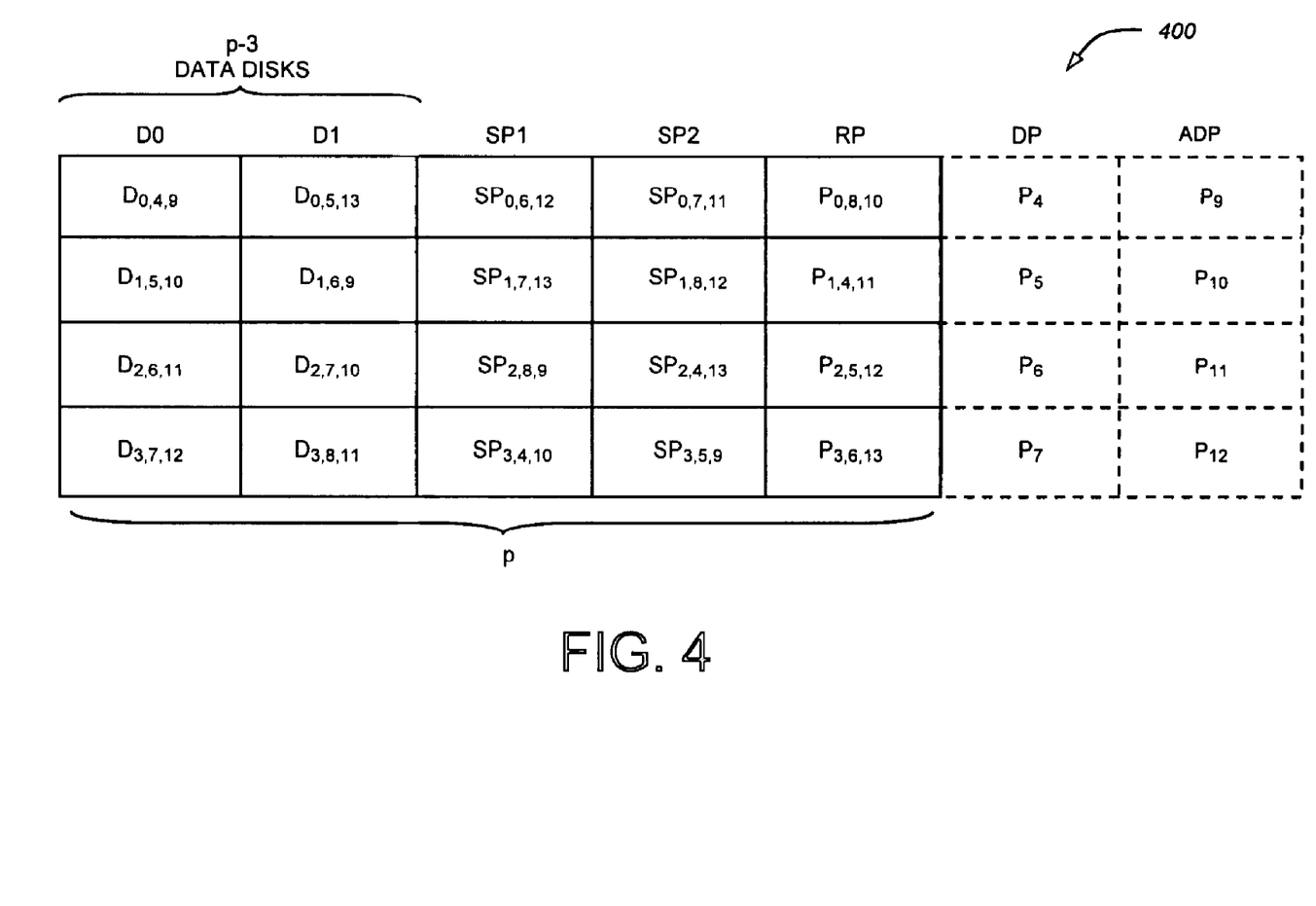
FIG. 4 is a block diagram of a disk array organized in accordance with an embodiment of the present invention.

The data blocks, symmetric parity blocks and the row parity blocks are numbered such that each block belongs to a diagonal parity set and, within each row, each block belongs to a different diagonal parity set. FIG. 4 is a schematic diagram illustrating assignment of blocks to parity groups in accordance with an embodiment of the present invention The notation $D_{a,b,c}$ and $P_{a,b,c}$ denotes the respective contributions of data (D) and parity (P) blocks to specific row (a), diagonal (b) and anti-diagonal (c) parity computations. That is, the notation $D_{a,b,c}$ means that those data blocks belong to the row or diagonal used for purposes of computing row parity a, diagonal parity b and anti-diagonal parity c, while $P_{a,b,c}$ stores the parity for row parity set a and also contributes to diagonal parity set b and anti-diagonal parity c. For example, $P_{0,8,10} = D_{0,4,9} \oplus D_{0,5,13} \oplus SP_{0,6,12} \oplus SP_{0,7,11}$, wherein $\oplus$ represent an XOR operation. The notation also includes the parity block used for purposes of computing the diagonal parity for a particular diagonal, e.g., $P_4 = D_{0,4,9} \oplus SP_{3,4,10} \oplus SP_{2,4,13} \oplus P_{1,4,11}$. Note that each of the diagonal parity blocks stored on the diagonal parity disk contains contributions from all but one of the is other disks (including the row parity disk but excluding the anti-diagonal disk) of the array. For example, the diagonal parity block $P_4$ has contributions from D0 ($D_{0,4,9}$), SP1 ($SP_{3,4,1}$), SP2 ($SP_{2,4,13}$) and RP ($P_{1,4,11}$), but no contribution from D1. Note also that the diagonal parity for diagonal 8 ($P_8$) is neither computed nor is it stored on the diagonal parity disk DP.

Figure 5:
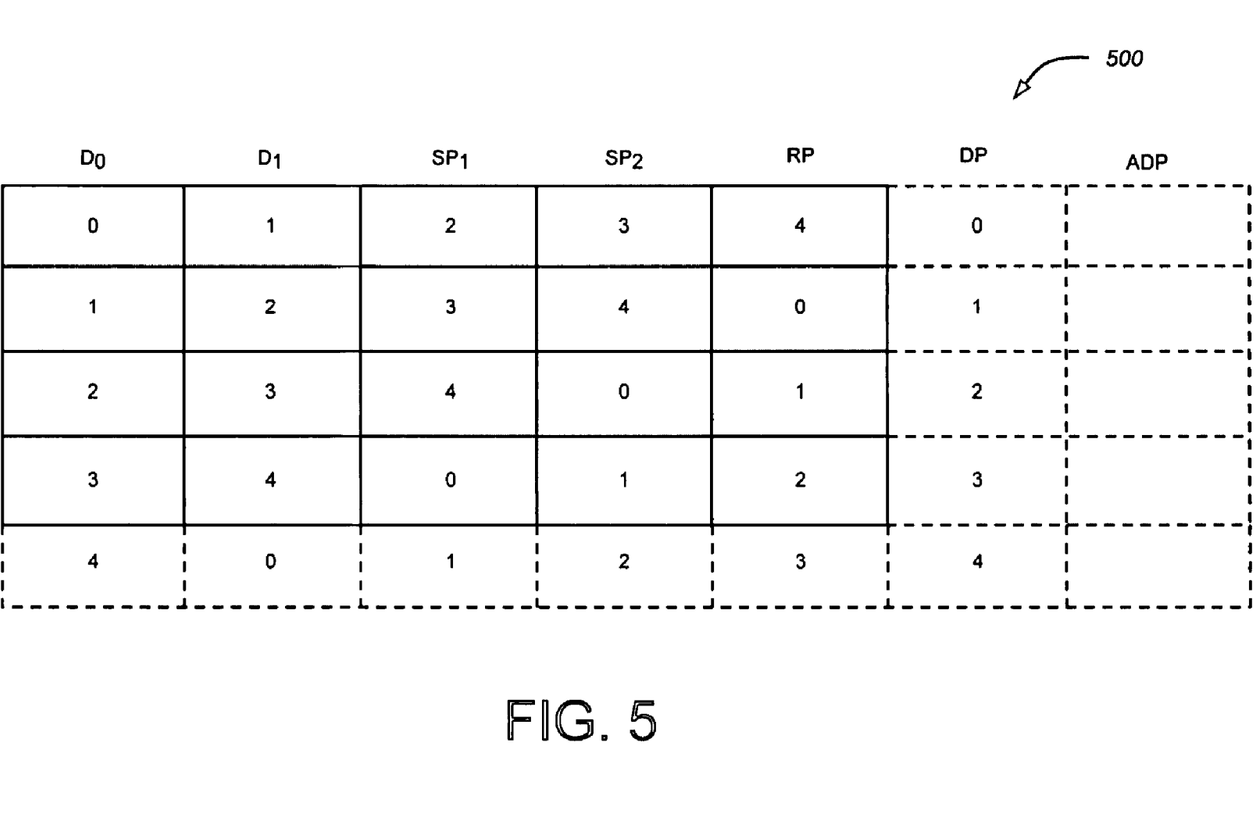
FIG. 5 is a schematic block diagram of a disk array showing diagonal parity stripes is in accordance with an embodiment of the present invention.
Figure 6:
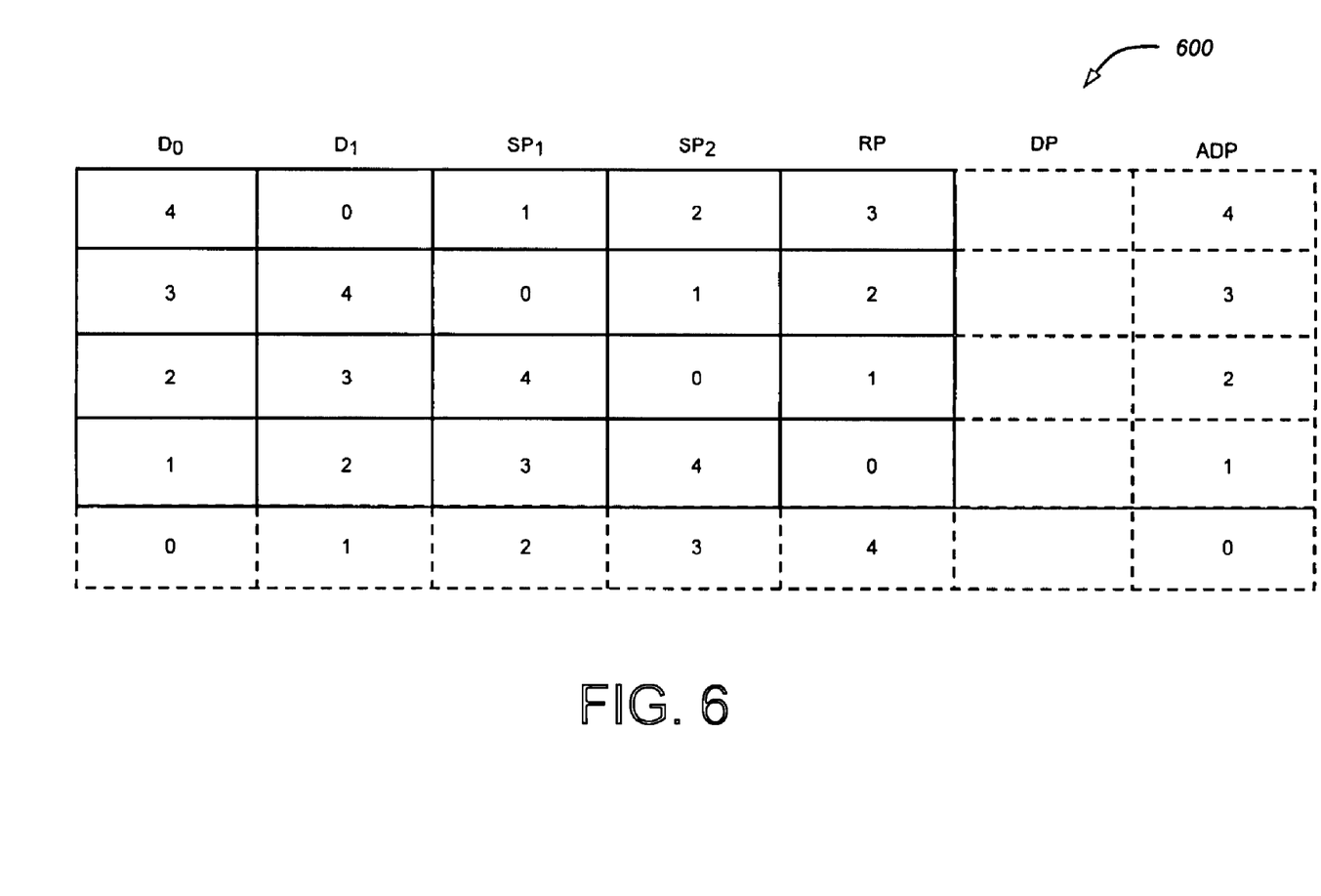
FIG. 6 is a schematic block diagram of a disk array showing anti-diagonal parity stripes in accordance with an embodiment of the present invention.

FIGS. 5 and 6 are schematic diagrams of an array showing the assignment of blocks to diagonals and anti-diagonals, respectively. FIG. 5 shows an array 500 illustrating the assignment of blocks to diagonals, wherein each block is labeled with a number corresponding to the diagonal to which it belongs. Also shown (in phantom) is the dropped diagonal that is not computed when encoding the array. Similarly, FIG. 6 shows an array 600 illustrating the assignment of blocks to anti-diagonals, including illustration (in phantom) of the dropped anti-diagonal that is not computed on the array. As noted above, the assignment of blocks to (anti-)diagonals may be permuted as long as no single disk includes two blocks of an (anti-)diagonal thereon.

D. Parity Encoding/Decoding

Figure 7:
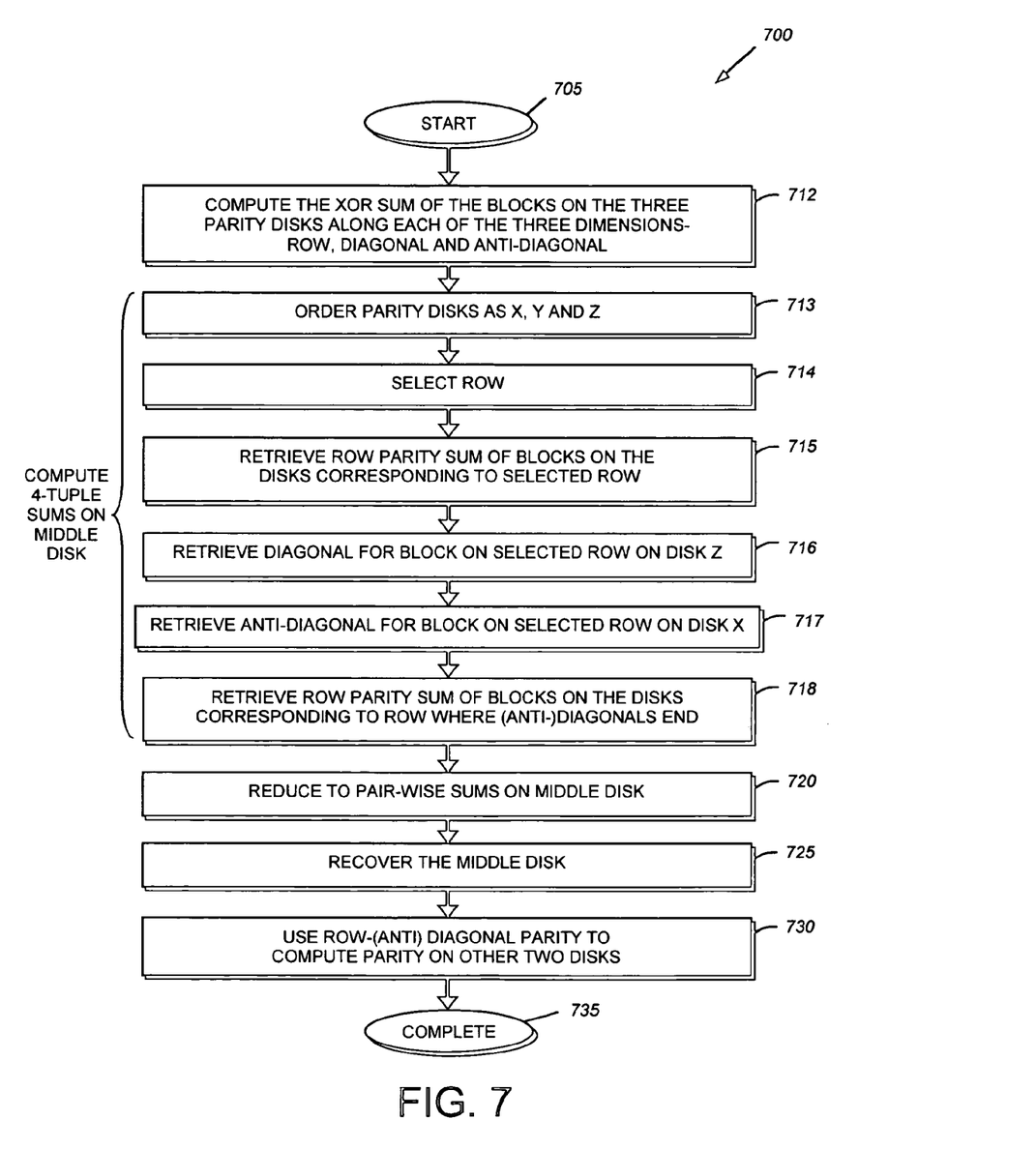
FIG. 7 is a flowchart detailing the steps of a procedure for performing symmetric triple parity computation in accordance with an embodiment of the present invention.

FIG. 7 is a flowchart detailing the steps of a procedure 700 for encoding/decoding symmetric triple parity in accordance with an embodiment of the present invention. It should be noted that in the illustrative embodiment, during an initial encoding operation, i.e., in response to an initial write operation, the three symmetric parity disks are assumed to have failed, thereby necessitating the computation of the parity that should be written in response to the write operation. It should be noted that for a write operation, only those parity blocks within the stripe where the write occurs need to be computed/reconstructed. This is in distinction to a disk failure where the disk(s) must be wholly reconstructed. Thus, as used herein, the term "failed disks" may include the three symmetric disks when performing an initial write operation.

Before initiating the encoding the parity, it should be noted that for each of the p disks, the XOR sum of blocks along each diagonal and anti-diagonal is zero. The procedure 700 begins in step 705 and continues to step 712 where the RAID system computes an algebraic operation, e.g., an XOR sum of the missing blocks on the three failed disks is along each of the three dimensions—row, diagonal and anti-diagonal. Illustratively, computing this sum at this point helps to reduce the number of XOR operations required to reconstruct the remaining two disks once the middle disk has been recovered.

For the purposes of description of procedure 700, assume that disks D0, D1 and SP2 have failed. For example, the row parity sum of missing blocks $D_{00}$, $D_{01}$ and $SP_{03}$ (blocks on the first row of FIG. 3) can be computed as $D_{00} \oplus D_{01} \oplus SP_{03} = RP_0 \oplus SP_{02}$ Similarly, the row parity sum of missing blocks $D_{30}$, $D_{31}$, and $SP_{33}$ (blocks on the fourth row of FIG. 3) can be computed as $D_{30} \oplus D_{31} \oplus SP_{33} = RP_3 \oplus SP_{32}$ The anti-diagonal parity sum of missing blocks $D_{00}$, $D_{11}$ and $SP_{33}$ (referencing FIG. 6, these are blocks on anti-diagonal 4) can be computed as $D_{00} \oplus D_{11} \oplus SP_{33} = ADP_0 \oplus SP_{22}$ The diagonal parity sum of missing blocks $D_{30}$, $D_{21}$ and $SP_{03}$ (referencing FIG. 5, these are blocks on diagonal 3) can be computed as $D_{30} \oplus D_{21} \oplus SP_{03} = DP_3 \oplus SP_{12}$ The RAID system then computes a total of p 4-tuple sums on the failed middle disk (steps 714-718). In step 713, the disks are ordered by defining a distance between the columns of the failed disks as:

$g = Y - X$ $h = Z - Y$

The RAID system then identifies the failed disks as X, Y and Z having a value equal to the index of the three failed disks in the array and wherein the disks are labeled from 0-p1. Thus, for example, if disks D0, D1 and SP2 from array 500 fail, then X=0, Y=1 and Z=3. It should be noted that other orderings of failed disks is possible. For a write operation, the failed disks are X=2, Y=3 and Z=4, i.e., to compute the parity for disks SP1, SP2 and RP. However, using the example of procedure 700 wherein X=0, Y=1 and Z=3, is then g=1-0=1 and h=3-1=2. By this definition, the Y disk is the middle disk.

In step 714, the RAID system selects a row k. For example, assume k=0. The system then retrieves the sum of the row parity of blocks on the failing (missing) disks corresponding to the selected row (step 715). In this example, the sum for row k=0 was previously computed as $D_{00} \oplus D_{01} \oplus SP_{03} = RP_0 \oplus SP_{02}$. In step 716, the system retrieves the diagonal for the block within row k that is on disk Z. Illustratively, assuming k=0, the sum of the missing blocks on this diagonal is $D_{30} \oplus D_{21} \oplus SP_{03} = DP_3 \oplus SP_{12}$. The RAID system then retrieves the anti-diagonal for the block on row k on disk X in step 717. Illustratively, this is equal to $D_{00} \oplus D_{11} \oplus SP_{33} = ADP_0 \oplus SP_{22}$.

As used herein, the row on which the (anti-)diagonal terminates is termed row q. In step 718, the RAID system retrieves the row parity sum of blocks on the missing disks corresponding to row q, which is illustratively $D_{30} \oplus D_{31} \oplus SP_{33} = RP_3 \oplus SP_{32}$.

In the illustrative embodiment, at each step 715-718, the retrieved sum is XORed together with the previous sum. For the example of row k=0, the total is:

$D_{00} \oplus D_{01} \oplus SP_{03} \oplus D_{30} \oplus D_{31} \oplus SP_{33} \oplus D_{00} \oplus D_{11} \oplus SP_{33} \oplus D_{30} \oplus D_{21} \oplus SP_{03} = RP_0 \oplus SP_{02} \oplus RP_3 \oplus SP_{32} \oplus ADP_0 \oplus SP_{22} \oplus DP_3 \oplus SP_{12}$ which reduces to:

$D_{01} \oplus D_{11} \oplus D_{21} \oplus D_{31} = RP_0 \oplus SP_{02} \oplus RP_3 \oplus SP_{32} \oplus ADP_0 \oplus SP_{22} \oplus DP_3 \oplus SP_{12}$ The right hand side of this equation is known, thereby leaving an equation with four unknowns on the middle disk. To solve for the missing data, p such sums are computed by starting crosses at different stripes. Since the array only contains p-1 rows, the pth 4-tuple sum is formed by constructing a cross using the phantom row $D_{40}$, $D_{41}$, $SP_{42}$, $SP_{43}$, and $RP_4$ and the dropped diagonal and anti-diagonal corresponding to Z and X respectively. More generally, duplicate terms in the top and bottom rows at each cross are canceled, thereby resulting in the sum of at most four blocks on the middle disk.

In this example, the first cross (based on row 0) results in a tuple comprising [0, 1, 2, 3] which represents the index of the blocks on the middle disk that are summed. By generating p crosses, the tuple corresponding to row k can be represented by [k, k+g, k+h, k+h+g] wherein all of the addition is performed modulo p.

It should be noted that the step of computing 4-tuple sums can be performed assuming an arbitrary ordering of the failed disks. In the above example the order chosen is X=0, Y=1 and Z=3. Alternately, a different ordering X=0, Y=3 and Z=1 could have been chosen. In this alternate case the middle disk would be Y=2 and the values are g=Y−X=3 and h=Z−Y=−2. It is thus apparent that for 3 disk failures there is a total of 6 possible orderings. Since each ordering results in a different set of values for g and h, the number of XOR operations required to solve the set of linear equations represented by the 4-tuple sums in order to recover the middle disk is different. For example, if the middle disk is recovered by first reducing the set of 4-tuple sums to pairwise sums, then the number of 4-tuples required would be different. Hence, to minimize the number of XOR operations required, the ordering that results in the fewest set of tuples required to reduce to a pairwise sum is chosen.

Also, the distance between erasure columns is notable in this step. Clearly, if g=h, then two additional blocks on the middle disk cancel out, thereby converting the 4-tuple to a 2-tuple. Hence the next step is not required for equidistant failures. Also, representing the tuple corresponding to row '0' as [0, g, h, h+g], one can generalize equidistant failures to the condition g==h mod(p) or [(g−h) mod p=0]. This condition implies that the second and the third blocks within the 4-tuple are identical and hence cancel out.

Once the 4-tuple sums have been constructed, the RAID system illustratively reduces the 4-tuple sums to pairwise sums on the middle disk in step 720. To form a pairwise sum, the system selects a subset of the equations such that the common blocks cancel out leaving only two blocks. Computing the sum for the subset results in a pairwise sum of blocks on the middle disk. It should be noted that the 4-tuple sums represent a set of linear equations that can be solved in a number of ways. Reduction to pairwise sums is one illustrative embodiment.

There may be multiple ways for choosing a subset of tuples to reduce them to a pairwise sum. In one embodiment, the subset of tuples is chosen by starting with a tuple corresponding to row k and choosing subsequent tuples at an offset g (or h) from the last. At each step, common blocks are cancelled and the process continues until only two unknown blocks are left remaining. This results in a pairwise sum.

For example, starting with the 4-tuple sum corresponding to row 0, i.e., [0, g, h, g+h], it is apparent that choosing another tuple at an offset g, helps cancel two blocks while adding two new blocks, thus keeping the total number of unknown blocks the same. This is because the tuple corresponding to row g is [g, 2 g, h+g, 2 g+h] which helps cancel common blocks g and h+g since they are present in both tuples. (all additions and multiplications are here assumed to be modulo p). Hence, starting with the 4-tuple corresponding to row 0 (treating this as the first step), and selecting consecutive tuples at an offset g, step m results in the sum of blocks [0, (m*g) mod p, h, (m*g+h)mod p].

Given that p is a prime and the condition $\{g, h < p\}$ holds, one can always find an m (0<m<p) such that [(m*g+h) mod p]=0 is true. Similarly, one can always find an m such that [(m*g−h) mod p]=0 is true. Hence, by choosing a m such that [(m*g+h) mod p]=0, the first and the fourth blocks in the result [0, (m*g) mod p, h, (m*g+h) mod p] can be cancelled after the mth step. Alternatively, by choosing an m such that '[(m*g−h) mod p]=0, the second and the third blocks can be cancelled after the mth step. Since only two unknown blocks are left, the process of selecting tuples can be terminated at this step. Repeating the above step by starting with 4-tuple sums at each of the p-1 rows results in p-1 pairwise sums By performing algebraic operations, one of the equations results in a single unknown equaling a known quantity, which in this case is zero, which may then be substituted into the previous equations to solve for all unknowns on the middle disk, thereby recovering the middle disk in step 725.

Specifically, as the construction of the array uses only p-1 rows, the pth block on is disk Y is zero. Thus, the value of the block that is pairwise XORed with the pth block is known at the completion of creation of the pairwise sums, i.e., an equation results with only one unknown. By substituting the solution to the recovered block, and using the other pairwise sums, the remaining blocks on the middle disk may be recovered. At this point, the RAID system has reconstructed the middle disk leaving only two failed disks. As this problem has been solved previously using row diagonal parity, the system implements such R-D parity to recover the missing two disks. Accordingly, once the middle disk has been recovered, the RAID system utilizes R-D parity to recover the remaining two disks in step 730 before completing in step 735. R-D parity is described in the above-incorporated U.S. patent application Ser. No. 10/035,607, filed on Dec. 28, 2001, now U.S. Pat. No. 6,993,701, issued Jan. 31, 2006, entitled ROW-DIAGONAL PARITY TECHNIQUE FOR ENABLING EFFICIENT RECOVERY FROM DOUBLE FAILURES IN A STORAGE ARRAY.

It should be noted that the symmetric TP technique of the present invention may also be utilized in recovering from triple failures in other applications that rely on redundant data streams. For example, the TP technique may be utilized in data communication applications, where additional data is transmitted to reduce the reliance on retransmissions to recover from up to three lost and/or corrupted packets. Additionally, it should be noted that in alternate embodiments, other algebraic operations, other than XOR operations, may be utilized.

It should be understood that the principles of the present invention may be utilized with any asymmetrical horizontal erasure code to generate a symmetric variant thereof. As such, the above description relating to symmetric triple erasure code algorithms is to be taken as exemplary only. More generally, any horizontal erasure code and technique may be modified to generate a symmetric variant in accordance with the principles of the present invention by introducing one or more symmetric parity disks and utilizing one or more phantom parity disks containing predetermined values to thereby enable parity encoding and decoding to occur utilizing identical algorithms.

The foregoing description has been directed to specific embodiments of this invention. Additionally, the procedures, processes and/or modules described herein may be implemented in hardware, software, embodied as a computer-readable medium having program instructions, firmware, or a combination thereof. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method comprising:

providing an array with a predetermined number of storage devices p configured to store data and three parity values, wherein p is a prime number;

dividing each of the predetermined storage device into blocks;

organizing the blocks into stripes, the stripes having a same number of blocks in each of the predetermined storage device;

defining a diagonal parity along a plurality of diagonal parity sets;

defining an anti-diagonal parity along a plurality of anti-diagonal parity sets;

assigning a predetermined value to the diagonal parity and anti-diagonal parity; and computing parity for the predetermined storage devices using values written to a plurality of the predetermined storage devices and the predetermined values assigned to the diagonal and anti-diagonal parity sets, the computed parity enabling recovery from three concurrent failures of storage devices in a storage array.

2. The method of claim 1, wherein the predetermined number of storage devices include a plurality of devices configured to store data and symmetric parity.

3. The method of claim 1 wherein each stripe comprises p-1 rows of blocks.

4. The method of claim 1 wherein the diagonal parity sets wrap around within a group of p-1 rows allowing all blocks belonging to diagonal parity sets of a stripe to be stored in the stripe, and the anti-diagonal parity sets wrap around within a group of p-1 rows allowing all blocks belonging to the anti-diagonal parity sets of a stripe to be stored in the stripe.

5. The method of claim 1, computing parity comprising computing a total of p 4-tuple sums on one of the predetermined number of storage devices configured to store symmetric parity.

6. The method of claim 5, computing comprising generating the computed 4-tuple sums using a number of crosses.

7. The method of claim 1 wherein the predetermined number of storage devices comprise a plurality of storage devices, and at least one storage device a phantom storage device wherein the spaces where the at least one phantom storage device treated as containing zero-value data constant in the parity computation.

8. The method of claim 1, wherein locations of parity blocks are configured to shift from device to device within different stripes.

9. The method of claim 1, the stripes further configured to a power of two number of bits in size.

10. A system configured to enable recovery from three or fewer concurrent failures of storage devices, the system comprising:

an array having a predetermined number of storage devices p configured to store data and three parity values, wherein p is a prime number;

a storage operating system including a device storage layer configured to implement a symmetric triple parity (TP) technique configured to, detect that three storage devices have concurrently failed;

compute a diagonal parity along diagonal parity sets, compute an anti-diagonal parity along anti-diagonal parity sets, the diagonal and anti-diagonal parity are assigned a predetermined value, compute parity for the predetermined storage devices using values written to a plurality of the predetermined storage devices and the predetermined values assigned to the diagonal and anti-diagonal parity sets, the computed parity enabling recovery from three concurrent failures of storage devices in a storage array; and a processing element configured to execute the storage operating system to thereby invoke storage access operations to and from the array in accordance with the triple parity technique.

11. The method of claim 10, wherein the predetermined number of storage devices include a plurality of devices configured to store data and symmetric parity.

12. The method of claim 10 wherein each stripe comprises p-1 rows of blocks.

13. The method of claim 10 wherein the diagonal parity sets wrap around within a group of p-1 rows allowing all blocks belonging to diagonal parity sets of a stripe to be stored in the stripe, and the anti-diagonal parity sets wrap around within a group of p-1 rows allowing all blocks belonging to the anti-diagonal parity sets of a stripe to be stored in the stripe.

14. The method of claim 10, computing parity comprising computing a total of p 4-tuple sums on one of the predetermined number of storage devices configured to store symmetric parity.

15. The system of claim 10, wherein the device storage layer is a RAID system and the storage devices are disks.

16. The system of claim 10, the RAID system further configured to divide each disk into blocks and organizes the blocks into stripes.

17. The system of claim 16, the RAID system further configured to implement in logic circuitry.

18. The system of claim 10 wherein the devices are one of a group consisting of: video tape, magnetic tape, optical, DVD, bubble memory, magnetic disk, electronic random access memory and micro-electro mechanical storage devices.

19. The system of claim 10, wherein the predetermined number of storage devices further comprising a plurality of storage devices, at least one storage device a phantom storage device wherein the spaces where there is at least one phantom device contain a zero-value data constant in the parity computation.

20. A computer readable medium containing executable program instructions executed by a processor, comprising:

program instructions that divide each of a predetermined storage devices p, configured to store data and three parity values, into blocks, wherein p is a prime number;

program instructions that organize the blocks into stripes, the stripes having a same number of blocks in each of the predetermined storage device;

program instructions that define a diagonal parity along a plurality of diagonal parity sets;

program instructions that define an anti-diagonal parity along a plurality of anti-diagonal parity sets;

program instructions that assign a predetermined value to the diagonal parity and anti-diagonal parity; and program instructions that compute parity for the predetermined storage is devices using values written to a plurality of the predetermined storage devices and the predetermined values assigned to the diagonal and anti-diagonal parity sets, the computed parity enabling recovery from three concurrent failures of storage devices in a storage array.

* * * * *

UNITED STATES PATENT AND TRADEMARK OFFICE
CERTIFICATE OF CORRECTION

| | | |
|---|---|---|
| PATENT NO. | : 7,979,779 B1 | Page 1 of 1 |
| APPLICATION NO. | : 12/560075 | |
| DATED | : July 12, 2011 | |
| INVENTOR(S) | : Atul Goel | |

It is certified that error appears in the above-identified patent and that said Letters Patent is hereby corrected as shown below:

In Col. 7, line 38 should read:
  p-2, and then assigning the block at ~~is~~ device i, row j to

In Col. 9, line 32 should read:
  vdisk on the storage system. In addition, ~~is~~ the storage oper- In Col. 10, line 26 should read:
  ~~modes~~ inodes to describe the files. The WAFL file system uses files In Col. 10, lines 28-32 should read:
  metadata files include, among others, an ~~mode~~ inode file. A file
  handle, i.e., and identifier that includes an ~~mode~~ inode number, is
  used to retrieve an ~~mode~~ inode from disk. A description of the
  structure of the file system, including on-disk ~~modes~~ inodes and the
  ~~mode~~ inode file, is provided in the U.S. Pat. No. 5,819,292 entitled In Col. 10, line 47 should read:
  the ~~mode~~ inode file using the ~~mode~~ inode number to access an appropriate Signed and Sealed this
Thirteenth Day of March, 2012

David J. Kappos
*Director of the United States Patent and Trademark Office*